United States Patent [19]

Gojak

[11] Patent Number: 5,697,464

[45] Date of Patent: Dec. 16, 1997

[54] RIDE-ON VEHICLE FOR GOLF CLUB BAG AND THE LIKE

[76] Inventor: Albert Ivan Gojak, 250 Willoughby Road, Naremburn, New South Wales, Australia, 2065

[21] Appl. No.: 512,176

[22] Filed: Aug. 7, 1995

[51] Int. Cl.[6] .................................................. B62D 61/06
[52] U.S. Cl. ........................... 180/21; 180/209; 180/211; 180/252; 180/208; 280/62
[58] Field of Search ............................ 180/21, 209, 210, 180/211, 213, 214, 252, 400, 208, 65.5, 447, 311; 280/639, 43, 62, 287, DIG. 5, DIG. 6, 771

[56] References Cited

U.S. PATENT DOCUMENTS

| | | | |
|---|---|---|---|
| 2,536,749 | 1/1951 | Jenner et al. | 180/209 X |
| 2,644,540 | 7/1953 | Balzer | 180/211 |
| 2,843,180 | 7/1958 | Schwartz | 280/62 |
| 3,266,589 | 8/1966 | Harris | 180/208 |
| 3,513,925 | 5/1970 | Figura | 180/208 |
| 3,599,408 | 8/1971 | Craven | 180/21 X |
| 3,797,597 | 3/1974 | Young | 180/208 |

*Primary Examiner*—Victor E. Johnson
*Attorney, Agent, or Firm*—Michael J. Striker

[57] ABSTRACT

A ride-on powered vehicle having a tricycle configuration has a frame having a front side and a rear side and provided with a load carrying space which is open at the front side for inserting a load into the load carrying space from the front side, a single rear wheel arranged at the rear side of the frame, motor unit for driving the rear wheel, a seat arranged above the rear wheel, a pair of front wheels spaced apart at the front side of the frame, a pair of handle bars arranged at the front side of the frame for steering the vehicle, a unit for connecting the handle bars with the rear wheel to steer the vehicle, and a unit for connecting each of the front wheels to the frame so as to enable folding of the front wheels to a position in which they lie closely against the frame thus substantially reducing an overall width of the vehicle and facilitating storage and maneuvering through narrow apertures.

5 Claims, 2 Drawing Sheets

RIDE-ON VEHICLE FOR GOLF CLUB BAG AND THE LIKE

FIELD OF THE INVENTION

The present invention relates to a ride-on vehicle intended principally although not exclusively as a means of carrying a bag of golf clubs on a golf course.

BACKGROUND ART

The object of the invention is to provide a powered vehicle of the tricycle type that can be ridden and steered by the rider of the vehicle, which is constructed so that it can be folded to a fairly narrow configuration for storage or manoeuvring through narrow spaces.

DISCLOSURE OF THE INVENTION

The present invention consists of a ride-on powered vehicle of tricycle configuration consisting of a frame providing space for carriage of a load, for example, a bag of golf clubs, a single rear wheel at the rear of the frame, motor means to arrange to drive the rear wheel, a seat arranged above the rear wheel, a pair of wheels splayed apart at the front of the frame, a pair of handle bars arranged on the frame at the front for steering the vehicle, a connection between the said handle bars and the rear wheel whereby movement of the handle bars to steer the vehicle causes corresponding movement of the rear wheel.

Preferably the front wheels are arranged on parallel links whereby they may be folded from a ground engaging configuration in which they are splayed apart to a configuration in which they lie closely against the frame of the vehicle.

DESCRIPTION OF THE DRAWINGS

In order that the invention may be better understood a preferred form thereof is hereinafter described, by way of example, with reference to the accompanying drawings in which.

DESCRIPTION OF PREFERRED EMBODIMENTS

Figure 1:
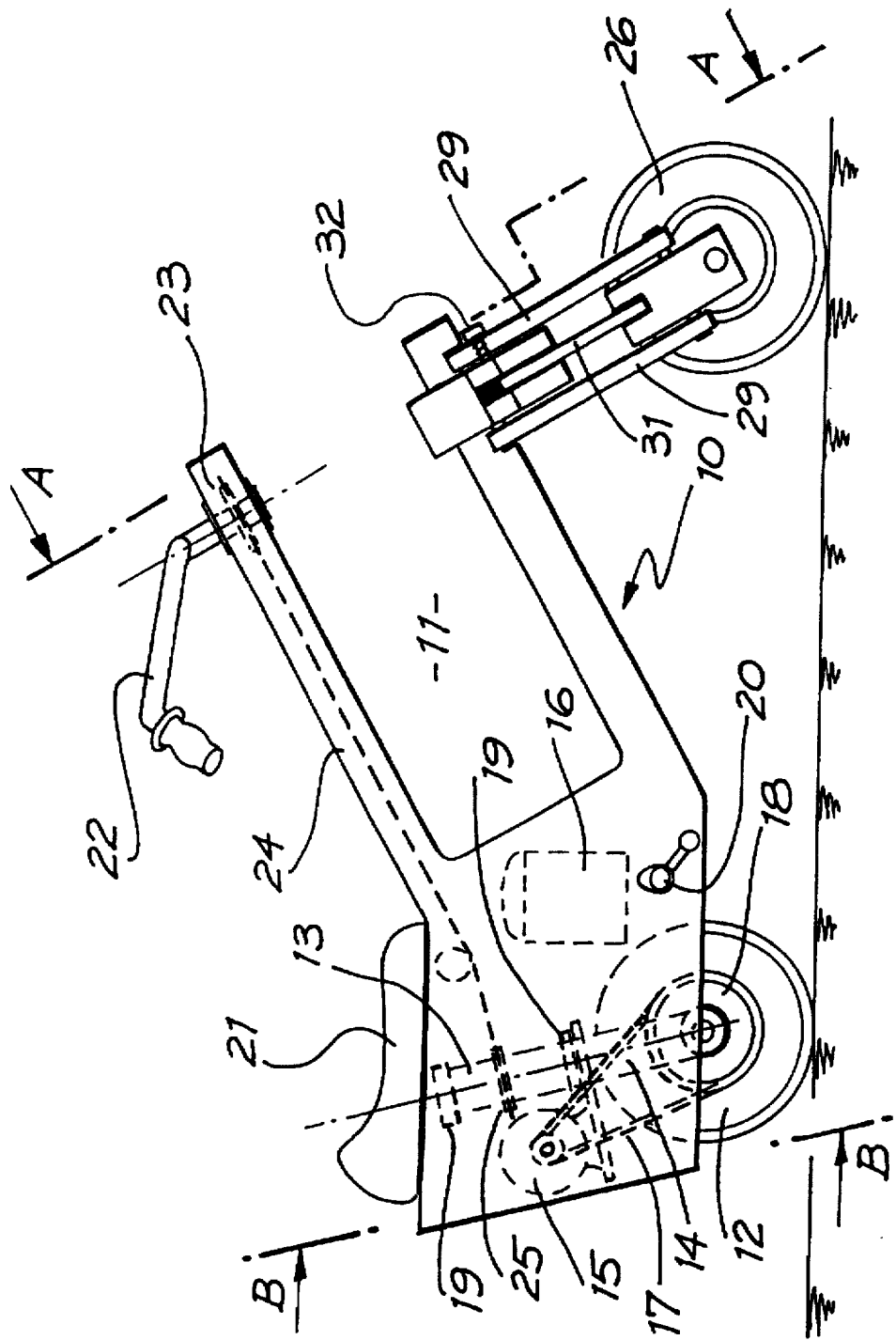
FIG. 1 is a side elevation of a vehicle according to the invention.

The vehicle illustrated in the drawings consist of a frame indicated generally at 10 which is constructed to provide a load carrying space 11 which, in the form of the invention shown in the drawings, is particularly adapted for the carriage of a bag of golf clubs which may be inserted from the front or the side of the vehicle. The frame may be of any desired construction providing the necessary degree of rigidity.

At the rear of the vehicle is mounted a rear wheel 12 carried on the post 13 and the yoke 14. The wheel 12 is arranged to be driven by the electric motor 15 mounted on the post 13 powered by battery 16. The drive from the motor 15 to wheel 12 is through the belt 17 and pulley 18.

The post 13 is rotatable in bearing 19 carried by the frame 10 and is rotatable about its substantially vertical axis in the manner described below. Above the post 13 is arranged a seat 21. A pair of foot rests 20 project on either side of the frame 10.

At the forward end of the frame are a pair of handle bars 22 mounted pivotably on the frame 10 and carrying a sprocket 23 which is connected by means of a chain 24 to a corresponding sprocket 25 mounted on the post 13. The vehicle is thus steered by turning the handle bars 22, which has the effect of turning the wheel 12.

Figure 2:
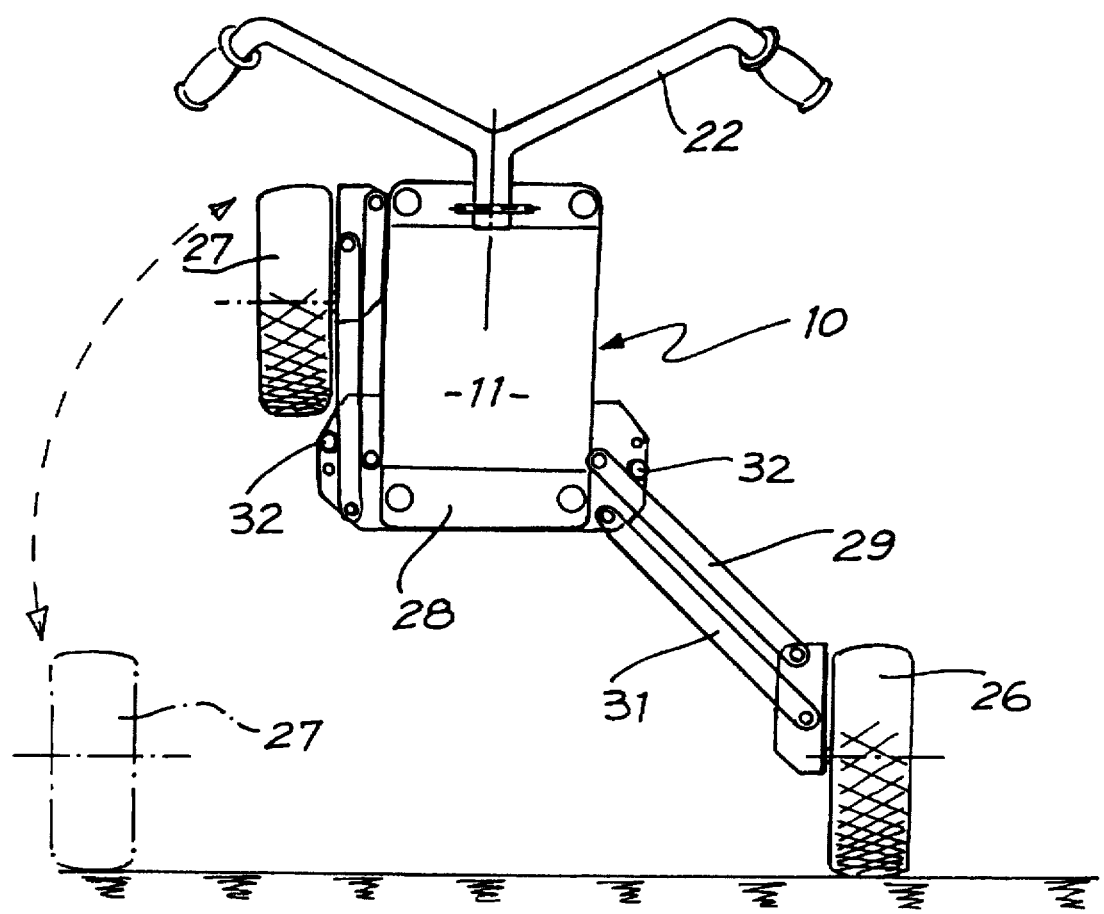
FIG. 2 is a sectional view on line A—A of FIG. 1.
Figure 3:
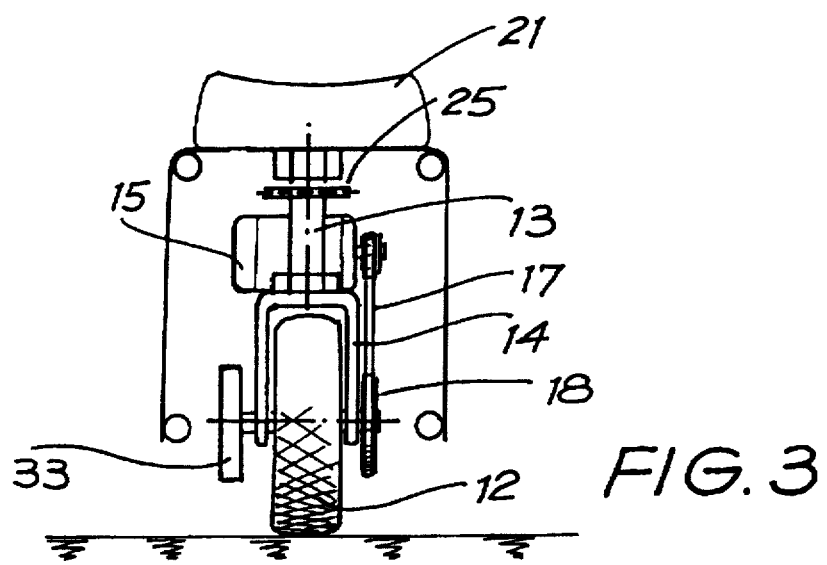
FIG. 3 is a sectional view on line B—B of FIG. 3.

Attached to the lower part of the frame at the front are a pair of wheels 26 and 27. These are connected to a cross member 28 by means of a parallel linkage consisting of outer pivoted links 29 and inner links 31. In use the wheels are splayed apart in the position shown on the right hand side of FIG. 2. They may however be folded up to the position shown on the left hand side of FIG. 2 to lie closely against the frame 10, thus substantially reducing the overall width of the vehicle and facilitating storage or manoeuvring through narrow apertures. The wheels may be locked in either position by means of spring loaded pins 32.

A brake such as that indicated diagramatically at 33 operable by means not shown may be provided for operation either by a hand or by a foot of the rider and it may be adapted for the use when the vehicle is moving or simply as a parking brake.

It will be appreciated by persons skilled in the art that numerous variations and/or modifications may be made to the invention as shown in the specific embodiments without departing from the spirit or scope of the invention as broadly claimed. The present embodiments are, therefore, to be considered in all respects as illustrative and not restrictive.

I claim:

1. A ride-on powered vehicle having a tricycle configuration, comprising a frame having a front side and a rear side and provided with a load carrying space which is open at said front side for inserting a load into said load carrying space from said front side; a single rear wheel arranged at said rear side of said frame; motor means for driving said rear wheel; a seat arranged above said rear wheel; a pair of front wheels spaced apart at said front side of said frame; a pair of handle bars arranged at said front side of said frame for steering the vehicle; means for connecting said handle bars with said rear wheel to steer the vehicle; and means for connecting each of said front wheels to said frame so as to enable folding of said front wheels from a splayed apart position to a folded position in which said front wheels lie closely against said frame thus substantially reducing an overall width of the vehicle and facilitating storage and maneuvering through narrow apertures.

2. A ride-on powered vehicle as defined in claim 1, wherein said means for connecting each of said front wheels with said frame include a pair of parallel links each connecting a respective one of said front wheels with said frame.

3. A ride-on powered vehicle as defined in claim 1; and further comprising a post which is rotatable in said frame about a substantially vertical axis and supports said rear wheel, said means for connecting said handle bars with said rear wheel including a first sprocket rotatable by a rotation of said handle bars, a second sprocket mounted on said post, and a chain interconnecting said sprockets.

4. A ride-on powered vehicle as defined in claim 1; and further comprising a post which is rotatable in said frame and supports said rear wheel, said motor means including an electric motor mounted on said post, and a belt with a pulley through which rotation is transmitted from said electric motor to said rear wheel.

5. A ride-on powered vehicle having a tricycle configuration, comprising a frame having a front side and a rear side and provided with a load carrying space which is open at said front side for inserting a load into said load carrying space from said front side; a single rear wheel arranged at said rear side of said frame; motor means for driving said rear wheel; a seat arranged above said rear wheel; a pair of front wheels spaced apart at said front side of said frame; a pair of handle bars arranged at said front side of said frame for steering the vehicle; means for connecting said handle bars with said rear wheel to steer the vehicle; and means for connecting each of said front wheels to said frame so as to enable folding of said front wheels from a splayed apart position to a folded position in which said front wheels lie closely against said frame thus substantially reducing an overall width of the vehicle and facilitating storage and maneuvering through narrow apertures, said means for connecting each of said front wheels of said frame including a pair of parallel links each connecting a respective one of said front wheels with said frame.

* * * * *